(12) United States Patent
Stevovich et al.

(10) Patent No.: US 9,568,309 B2
(45) Date of Patent: Feb. 14, 2017

(54) PEDAL ASSEMBLY, APPARATUS FOR DETERMINING A PEDAL CONFIGURATION, AND METHODS THEREOF

(71) Applicants: Nikola Stevovich, Rocky River, OH (US); David Pierson, Lakewood, OH (US)

(72) Inventors: Nikola Stevovich, Rocky River, OH (US); David Pierson, Lakewood, OH (US)

( * ) Notice: Subject to any disclaimer, the term of this patent is extended or adjusted under 35 U.S.C. 154(b) by 243 days.

(21) Appl. No.: 14/216,268

(22) Filed: Mar. 17, 2014

(65) Prior Publication Data

US 2014/0259705 A1  Sep. 18, 2014

Related U.S. Application Data

(60) Provisional application No. 61/792,712, filed on Mar. 15, 2013, provisional application No. 61/789,031, filed on Mar. 15, 2013.

(51) Int. Cl.
*G01B 21/00* (2006.01)
*G01B 21/22* (2006.01)
*B62M 3/08* (2006.01)

(52) U.S. Cl.
CPC ............... *G01B 21/22* (2013.01); *B62M 3/08* (2013.01); *B62K 2207/00* (2013.01); *Y10T 74/217* (2015.01); *Y10T 74/2168* (2015.01)

(58) Field of Classification Search
CPC .................................. G01B 21/22; B62M 3/08
(Continued)

(56) References Cited

U.S. PATENT DOCUMENTS 1,509,793 A  9/1924  Thompson
2,749,771 A  6/1956  Pearl
(Continued)

FOREIGN PATENT DOCUMENTS

DE  4336183 A1  4/1994
EP  0031627 B1  7/1981
(Continued)

OTHER PUBLICATIONS

Grunfeld, Michael; International Search Report and Written Opinion of the International Searching Authority, issued in International Application No. PCT/US2008/050602, dated as mailed on Jul. 4, 2008; 7 pages.
(Continued)

*Primary Examiner* — Yaritza Guadalupe-McCall
(74) *Attorney, Agent, or Firm* — Ulmer & Berne LLP

(57) ABSTRACT

A pedal assembly for a velocipede is provided. The pedal assembly includes an axle, pedal body, a first drive pin and a first actuator. The axle includes a distal end and a proximal end. The axle defines a first cam groove. The proximal end is configured for releasable attachment to a crankshaft. The pedal body is rotatably coupled with the axle and is rotatable with respect to the axle about an axis. The axis resides in an imaginary plane. The first drive pin is movably coupled with the pedal and is movable between an inserted position and a withdrawn position. The first actuator is movably attached to the pedal body and is associated with the first drive pin. The first actuator is movable between a first position and a second position. An apparatus for determining a pedal configuration for a user is also provided.

20 Claims, 12 Drawing Sheets

(58) Field of Classification Search
USPC .......................................... 33/1 N, 193, 337
See application file for complete search history.

(56) References Cited

U.S. PATENT DOCUMENTS

| | | | |
|---|---|---|---|
| 3,260,289 A | 7/1966 | Whitten, Jr. | |
| 3,307,425 A | 3/1967 | Sykes et al. | |
| 3,320,826 A | 5/1967 | Morse | |
| 3,457,803 A | 7/1969 | Sykes et al. | |
| 3,596,525 A | 8/1971 | Niesz | |
| 4,193,324 A | 3/1980 | Marc | |
| 4,526,036 A | 7/1985 | Morrison | |
| 4,648,287 A | 3/1987 | Preskitt | |
| 5,172,926 A | 12/1992 | Mannino | |
| 5,199,324 A | 4/1993 | Sain | |
| 5,370,200 A * | 12/1994 | Takata | B60L 3/0092 180/206.4 |
| 5,433,680 A | 7/1995 | Knudsen | |
| 5,449,332 A | 9/1995 | Hervig | |
| 5,634,382 A | 6/1997 | Fan | |
| 5,676,497 A | 10/1997 | Kim | |
| 5,992,553 A * | 11/1999 | Morrison | B62M 6/45 180/206.2 |
| 6,234,046 B1 | 5/2001 | Coombe | |
| 6,241,639 B1 | 6/2001 | Hervig | |
| 6,619,682 B1 | 9/2003 | Carr et al. | |
| 6,745,643 B2 | 6/2004 | Lubanski | |
| 6,783,139 B1 | 8/2004 | Wang et al. | |
| 7,918,768 B2 | 4/2011 | Rogozinski | |
| 8,117,944 B2 | 2/2012 | Stevovich | |
| 8,464,608 B2 | 6/2013 | Chen | |
| 8,893,581 B2 * | 11/2014 | White | B62M 3/08 74/594.1 |
| 2004/0004341 A1 | 1/2004 | Carr et al. | |
| 2007/0142177 A1 | 6/2007 | Simms et al. | |
| 2007/0163380 A1 | 7/2007 | Chen | |
| 2008/0011121 A1 | 1/2008 | Topfer | |
| 2008/0121068 A1 | 5/2008 | Chen | |
| 2009/0229405 A1 | 9/2009 | White | |
| 2011/0083530 A1 | 4/2011 | Inoue | |
| 2012/0073402 A1 | 3/2012 | Tseng | |
| 2013/0205896 A1 | 8/2013 | Baechler | |
| 2014/0259705 A1 * | 9/2014 | Stevovich | B62M 3/08 33/1 N |
| 2016/0072042 A1 * | 3/2016 | Fukuda | B62M 3/00 310/338 |

FOREIGN PATENT DOCUMENTS

| | | |
|---|---|---|
| WO | 9600679 A1 | 1/1996 |
| WO | 2005115826 A1 | 12/2005 |

OTHER PUBLICATIONS

Copenheaver, Blaine R.; International Search Report and Written Opinion of the International Searching Authority, issued in International Application No. PCT/US2014/030382, dated as mailed on Oct. 14, 2014; 12 pages.

* cited by examiner

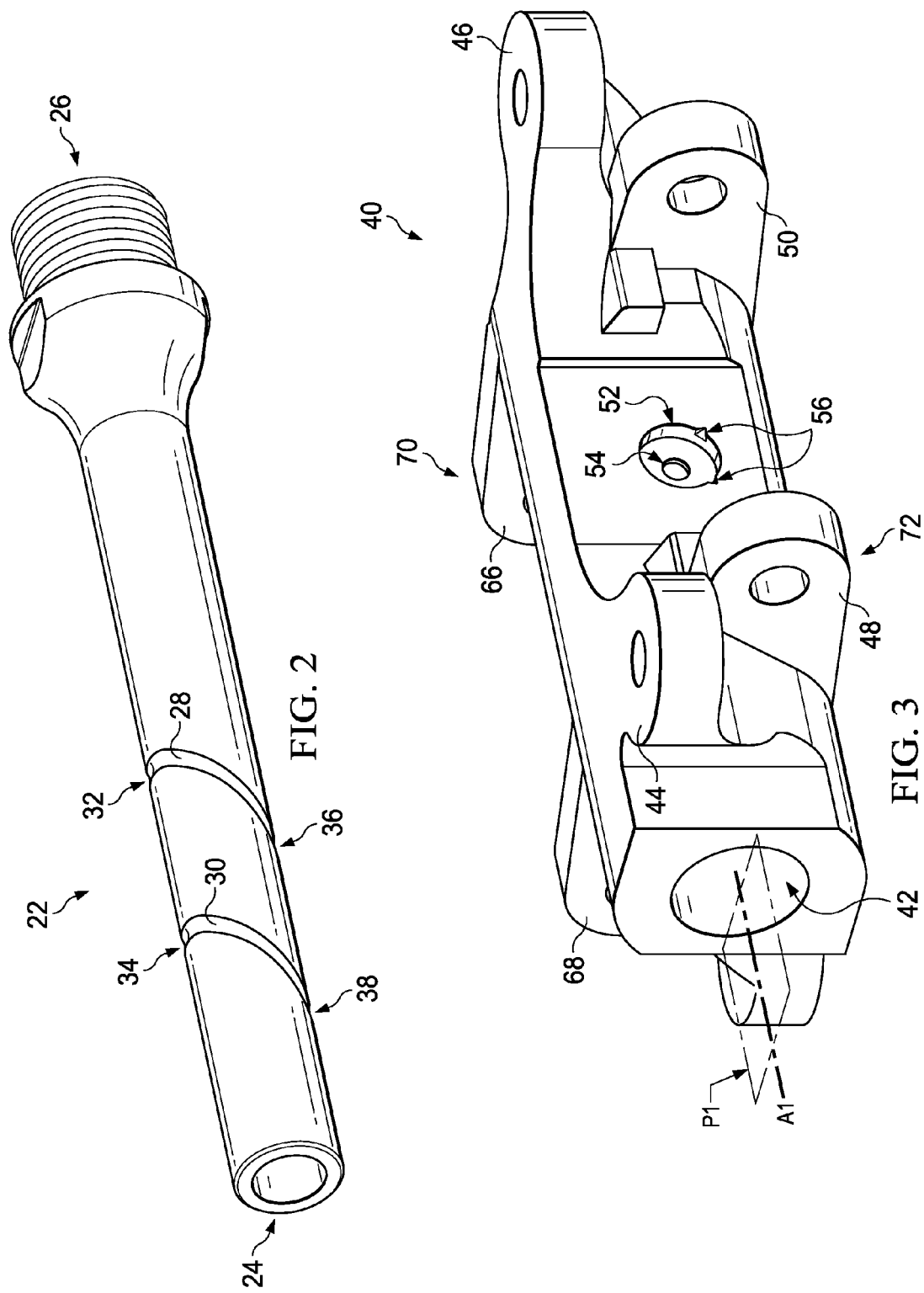

PEDAL ASSEMBLY, APPARATUS FOR DETERMINING A PEDAL CONFIGURATION, AND METHODS THEREOF

REFERENCE TO RELATED APPLICATION

This application claims priority of U.S. provisional patent application Ser. Nos. 61/789,031 and 61/792,712, filed Mar. 15, 2013, and hereby incorporates these provisional patent applications by reference herein in its entirety. This application also incorporates by reference herein in its entirety, PCT Application No. PCT/US14/30382, filed Mar. 17, 2014.

TECHNICAL FIELD

A pedal assembly for a velocipede includes a drive pin that is movable between an inserted position and a withdrawn position with respect to a cam groove of an axle.

BACKGROUND

Conventional single or multi sided pedal assemblies can include an axle and a pedal assembly that is movable laterally with respect to the axle.

SUMMARY

In accordance with one embodiment, a pedal assembly for a velocipede is provided. The pedal assembly comprises an axle, a pedal body, a first drive pin, and a first actuator. The axle comprises a distal end and a proximal end. The axle defines a first cam groove. The proximal end is configured for releasable attachment to a crankshaft. The pedal body is rotatably coupled with the axle and rotatable with respect to the axle about an axis. The axis resides in an imaginary plane. The first drive pin is movably coupled with the pedal and is movable between an inserted position and a withdrawn position. The first actuator is movably attached to the pedal body and associated with the first drive pin. The first actuator is movable between a first position and a second position. The first drive pin is movable between the inserted position and the withdrawn position in response to movement of the first actuator between the first position and the second position, respectively. When the first drive pin is in the withdrawn position it is withdrawn from the first cam groove. When the first drive pin is in the inserted position, it is inserted into the first cam groove such that the pedal body is permitted to move laterally with respect to the axle generally along the axis when the pedal body rotates with respect to the axle.

In accordance with one embodiment, a pedal assembly for a velocipede is provided. The pedal assembly comprises an axle, a pedal body, a first drive pin, a first actuator, a second drive pin, a second actuator, and a clip assembly. The axle comprises a distal end and a proximal end. The axle defines a first cam groove. The proximal end is configured for releasable attachment to a crankshaft. The pedal body is rotatably coupled with the axle and is rotatable with respect to the axle about an axis. The axis resides in an imaginary plane. The first drive pin is movably coupled with the pedal and is movable between an inserted position and a withdrawn position. The first actuator is movably attached to the pedal body and is associated with the first drive pin. The first actuator is movable between a first position and a second position. The second drive pin is movably coupled with the pedal and is movable between an inserted position and a withdrawn position. The second actuator is movably attached to the pedal body and is associated with the second drive pin. The second actuator is movable between a first position and a second position. The clip assembly comprises a pair of clips that cooperate to selectively grasp a foot of a rider at an upper area of the pedal body and a lower area of the pedal body. The first drive pin is movable between the inserted position and the withdrawn position in response to movement of the first actuator between the first position and the second position, respectively. The first actuator is moved from the first position to the second position in response to a foot of a rider being inserted into the clip assembly at the upper area. When the first drive pin is in the withdrawn position it is withdrawn from the first cam groove. The second drive pin is movable between the inserted position and the withdrawn position in response to movement of the second actuator between the first position and the second position, respectively. The second actuator is moved from the first position to the second position in response to a foot of a rider being inserted into the clip assembly at the lower area. When the second drive pin is in the withdrawn position it is withdrawn from the first cam groove.

In accordance with another embodiment, a vehicle comprises a pedal assembly for a velocipede. The pedal assembly comprises an axle, a pedal body, a first drive pin, and a first actuator. The axle comprises a distal end and a proximal end. The axle defines a first cam groove. The proximal end is configured for releasable attachment to a crankshaft. The pedal body is rotatably coupled with the axle and rotatable with respect to the axle about an axis. The axis resides in an imaginary plane. The first drive pin is movably coupled with the pedal and is movable between an inserted position and a withdrawn position. The first actuator is movably attached to the pedal body and associated with the first drive pin. The first actuator is movable between a first position and a second position. The first drive pin is movable between the inserted position and the withdrawn position in response to movement of the first actuator between the first position and the second position, respectively. When the first drive pin is in the withdrawn position it is withdrawn from the first cam groove. When the first drive pin is in the inserted position, it is inserted into the first cam groove such that the pedal body is permitted to move laterally with respect to the axle generally along the axis when the pedal body rotates with respect to the axle.

In accordance with yet another embodiment, an apparatus for determining a pedal configuration for a user is provided. The apparatus comprises an axle, a pedal body, and at least one sensor. The axle comprises a distal end and a proximal end. The proximal end is configured for releasable attachment to a crankshaft. The pedal body is rotatably coupled with the axle and is rotatable with respect to the axle about an axis. The pedal body is further configured to move laterally with respect to the axle generally along the axis. At least one sensor is disposed on the pedal body. The pedal body is configured to facilitate rotation of the crankshaft. The at least one sensor is configured to detect spatial position data. The spatial position data comprises rotational data for the pedal body and lateral data for the pedal body.

In accordance with yet another embodiment, a method of determining a pedal configuration for a user is provided. The method comprises providing a bicycle. The bicycle comprises a crankshaft, an axle, a pedal body, at least one sensor, and a controller. The axle comprises a distal end and a proximal end. The proximal end is releasably attached to the crankshaft. The pedal body comprises an engagement surface. The pedal body is rotatably coupled with the axle and is rotatable with respect to the axle about an axis. The pedal body is further configured to move laterally with respect to the axle generally along the axis. The at least one sensor is disposed on the pedal body and is configured to detect spatial position data. The spatial position data comprises rotational position data for the pedal body and lateral position data for the pedal body. The controller is configured to receive the spatial position data. The method further comprises rotating the crankshaft by applying force to the engagement surface and receiving, by the controller, the spatial position data. The method further comprises determining, by the controller, a rotational motion of the pedal from the rotational position data and determining, by the controller, a lateral motion of the pedal from the lateral position data.

BRIEF DESCRIPTION OF THE DRAWINGS

It is believed that certain embodiments will be better understood from the following description taken in conjunction with the accompanying drawings in which:

FIG. 2 is a perspective view of an axle of the pedal assembly of FIG. 1;

FIG. 3 is a perspective view of a pedal body of the pedal assembly of FIG. 1;

DETAILED DESCRIPTION

Figure 1:
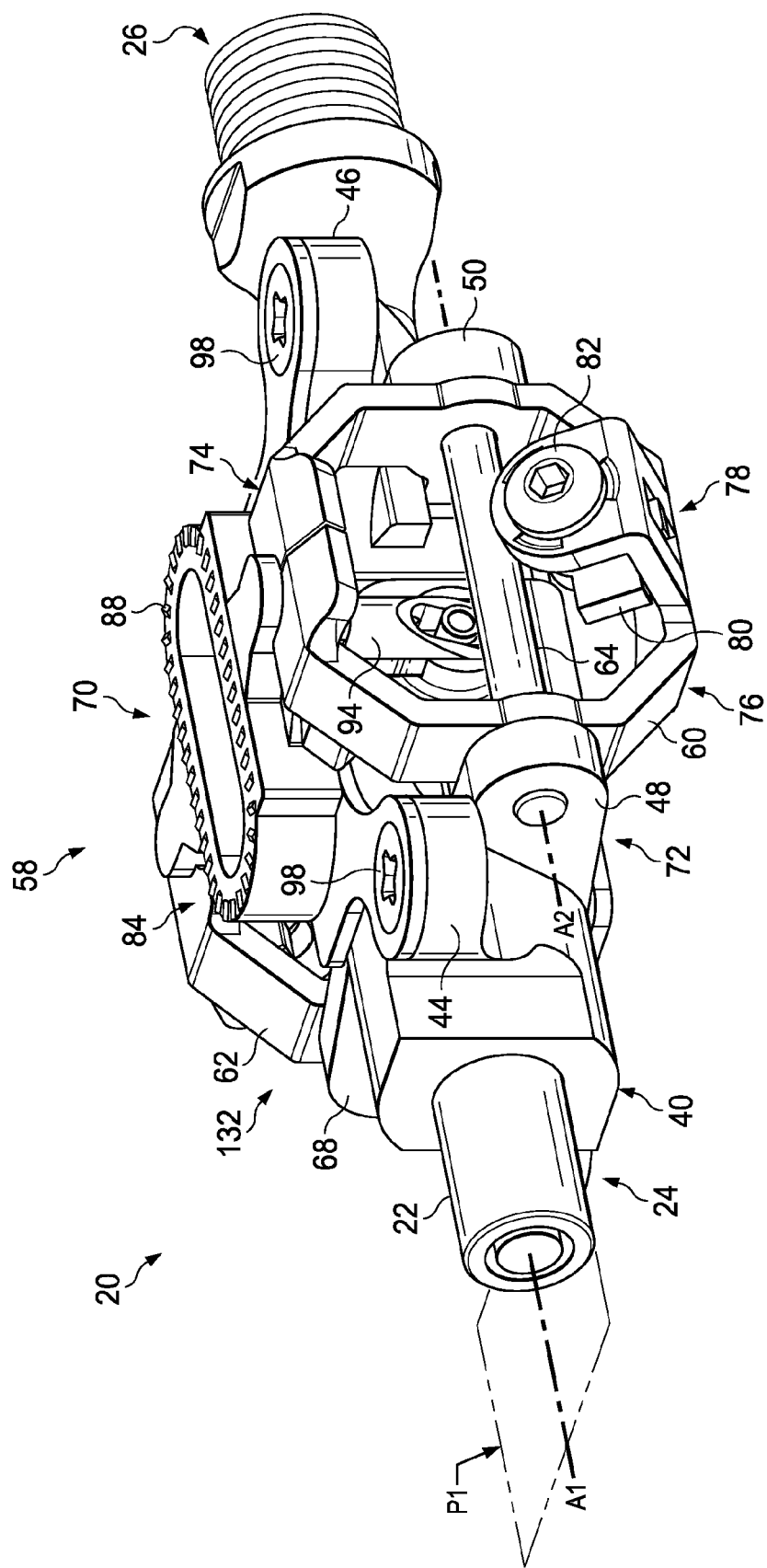
FIG. 1 is a perspective view of a pedal assembly according to one embodiment.

Certain embodiments are described herein in connection with the views and examples of FIGS. 1-17 wherein like numbers indicate the same or corresponding elements throughout the views. As illustrated in FIG. 1, a pedal assembly 20 for a velocipede (not shown) is provided. A velocipede can include a unicycle, a bicycle, a stationary bike, a bike fitting system, a tricycle, or any of a variety of other human-powered vehicle with one or more wheels. The pedal assembly 20 can include an axle 22 comprising a distal end 24 and a proximal end 26. The proximal end 26 can be configured for releasable attachment to a crankshaft (not shown). In one embodiment, as illustrated in FIG. 1, the proximal end 26 can comprise a threaded end that can be threadably engaged with the crankshaft. In other embodiments, the proximal end 26 can be any of a variety of suitable alternative arrangements that facilitate releasable attachment to a crankshaft.

As illustrated in FIG. 2, the axle 22 can define first and second cam grooves 28, 30 that are disposed between the distal end 24 and the proximal end 26. The first and second cam grooves 28, 30 can be arcuate with upper portions 32, 34 of the first and second cam grooves 28, 30 such that they are more proximate to the proximal end 26 than lower portions 36, 38 of the first and second cam grooves 28, 30. It is to be appreciated that, in alternative embodiments, an axle can define only one cam groove or more than two cam grooves and the grooves can be provided at a variety of different angles (e.g., individually or with respect to each other).

As illustrated in FIGS. 1 and 3, the pedal assembly 20 can include a pedal body 40 that is rotatably coupled with the axle 22 and is rotatable with respect to the axle about an axis A1. The axis A1 can reside in an imaginary plane P1. As illustrated in FIG. 3, the pedal body 40 can define a passageway 42 through which the axle 22 can extend. In one embodiment, the pedal body 40 can be journalled with respect to the axle 22 by at least one bearing or bushing (not shown) disposed within the passageway 42. As illustrated in FIG. 3, the pedal body 40 can include a pair of bracket flanges 44, 46 and a pair of clip flanges 48, 50. The pedal body 40 can define a recess 52 that is disposed between the clip flanges 48, 50. A bore 54 can extend from the passageway 42 and into the recess 52 such that the passageway 42 and the recess 52 are in communication with each other. In one embodiment, as illustrated in FIG. 3, the recess 52 can include a pair of notched portions 56.

Referring again to FIG. 1, the pedal assembly 20 can include a clip assembly 58 that is configured to selectively grasp a foot of a rider. The clip assembly 58 can comprise a pair of clips 60, 62 that can be pivotally coupled with the pedal body 40. In one embodiment, as illustrated in FIG. 1, the clip 60 is shown to be pivotally coupled with the clip flanges 48, 50 by a pin 64 which is threadably engaged with the clip flange 48. In such an embodiment, the clip 62 can be similarly pivotally coupled with other clip flanges 66, 68 by a pin (not shown) but on an opposite side of the pedal body 40. The clips 60, 62 can be pivotable about respective clip axes (e.g., A2 shown for clip 60) which in some embodiments can be generally parallel with the axis A1.

The pair of clips 60, 62 can cooperate to selectively grasp a foot of a rider at respective upper and lower areas 70, 72 (FIG. 1) of the pedal body 40. In one embodiment, the upper area 70 and the lower area 72 are disposed on opposite sides of the imaginary plane P1.

Figure 4:
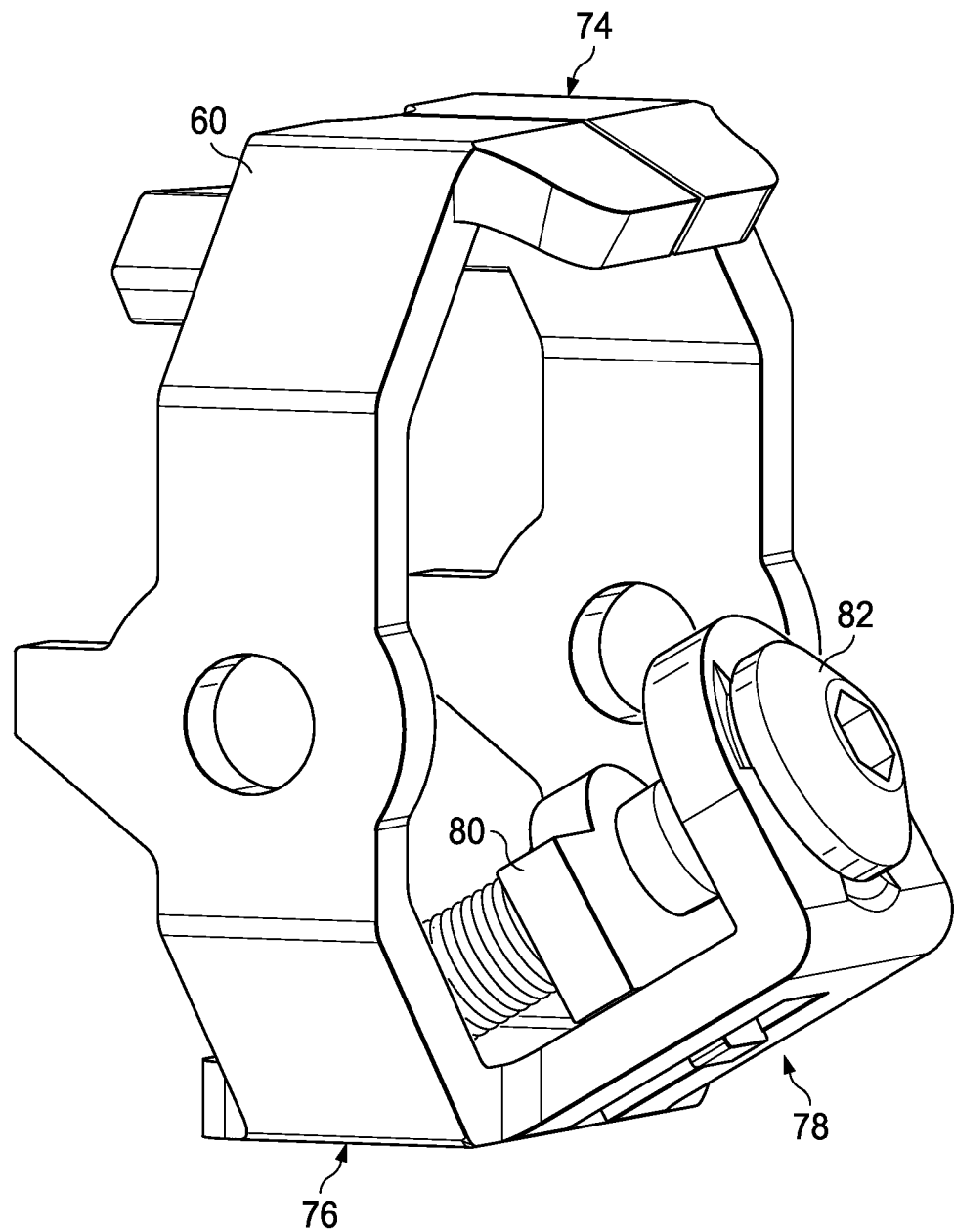
FIG. 4 is a perspective view of a clip of the pedal assembly of FIG. 1.

Referring now to FIG. 4, the clip 60 can include a heel engagement portion 74 and a toe engagement portion 76. The toe engagement portion 76 can include a toe retention assembly 78 having a spring plate 80 and a set screw 82. With the clip 60 coupled with the pedal body 40, as illustrated in FIG. 1, the heel engagement portion 74 can be disposed at the upper area 70 of the pedal body 40 and the toe engagement portion 76 can be disposed at the lower area 72 of the pedal body 40. The clip 62 can be similar to, or the same as, in many respects as the clip 60, shown in FIG. 4. However, as illustrated in FIG. 1, the clip 62 can be pivotally coupled with the pedal body 40 in an upside-down arrangement relative to the clip 60 such that a heel engagement portion 84 and a toe engagement portion (not shown) are disposed at the lower area 72 and the upper area 70, respectively.

As illustrated in FIG. 1, a cleat 88 from a rider's shoe can be inserted between the heel engagement portion 74 of the clip 60 and the toe engagement portion (not shown) of the clip 62 to secure a rider's foot at the upper area 70. With the cleat 88 inserted, the heel engagement portion 74 of the clip 60 and the toe engagement portion (not shown) can be biased toward each other, such as with a pin mounted spring (not shown), for example, to retain the cleat 88 such that the rider's foot is secured (e.g. "clipped in") at the upper area 70. With the cleat 88 secured, the position of the spring plate 80 can be adjusted with the set screw 82 to adjust the gripping force on the cleat 88. The cleat 88 can alternatively be inserted between the toe engagement portion 76 of the clip 60 and the heel engagement portion 84 of the clip 62 to secure a rider's foot at the lower area 72. With the cleat 88 inserted, the toe engagement portion 76 and the heel engagement portion 84 can be biased toward each other to retain the cleat 88 such that the rider's foot is secured (e.g. "clipped in") at the lower area 72. It is to be appreciated that any of a variety of suitable alternative clip assemblies can be provided for selectively coupling a user's foot to a pedal.

Figure 5:
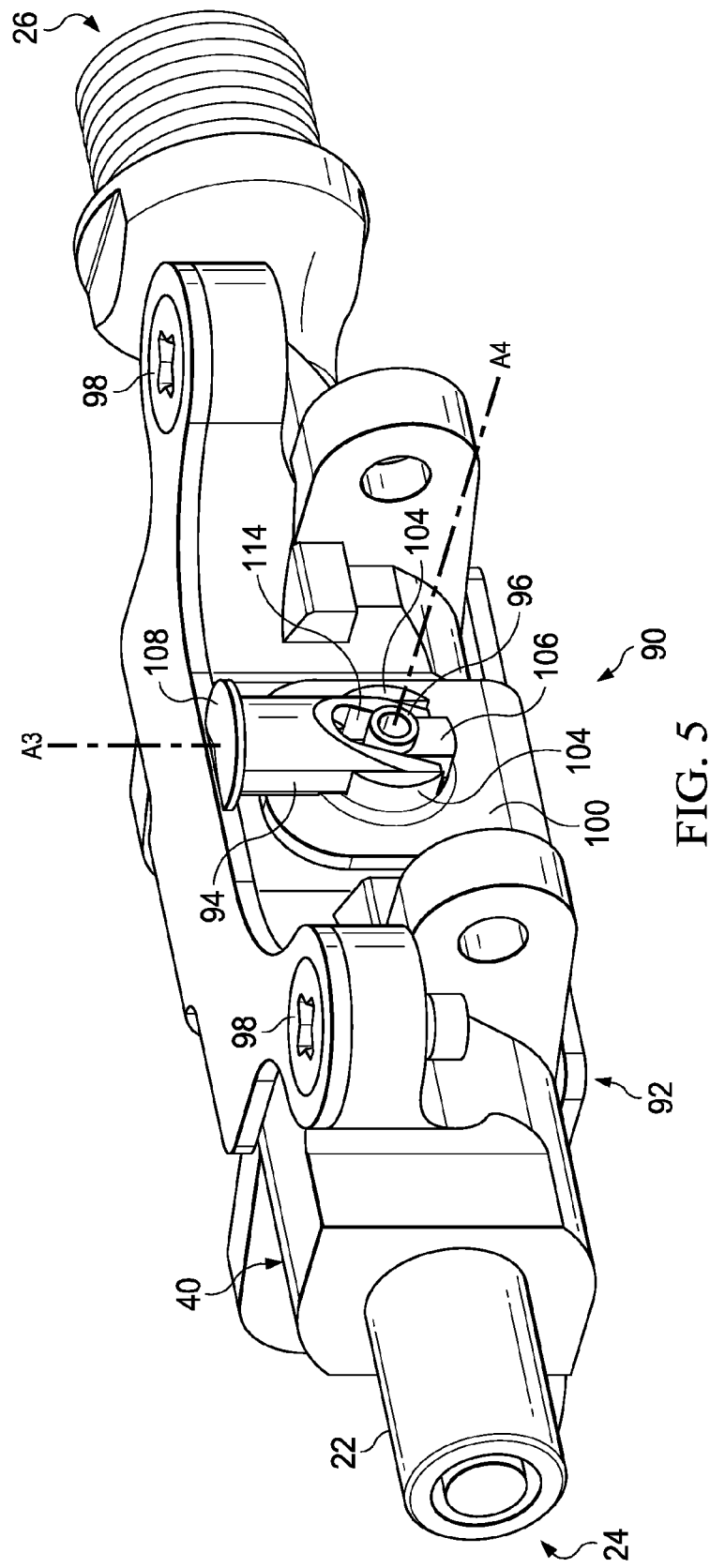
FIG. 5 is a perspective view of the pedal assembly of FIG. 1 but with certain components removed for clarity of illustration.
Figure 6:
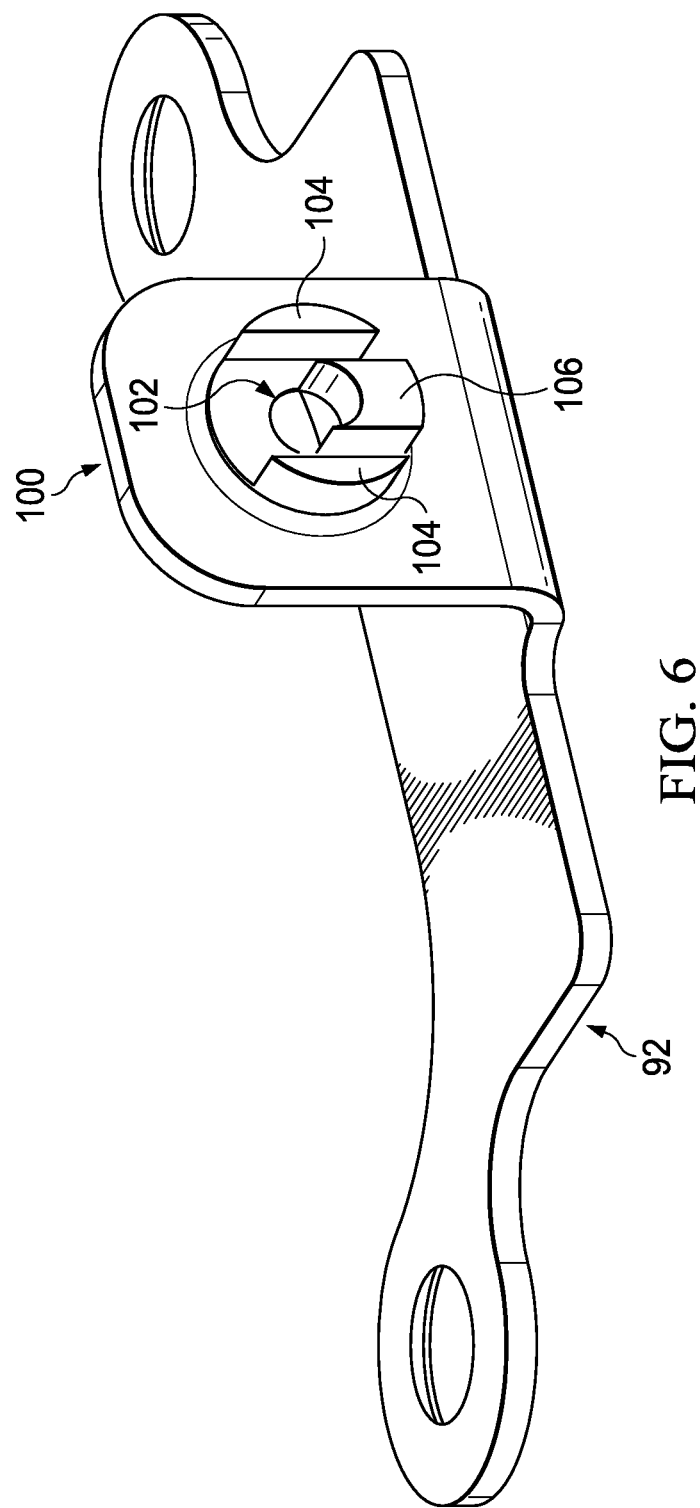
FIG. 6 is a perspective view of a bracket of the pedal assembly of FIG. 1.

Referring now to FIG. 5, the pedal assembly 20 can include a drive pin assembly 90 that includes a bracket 92, an actuator pin 94, and a drive pin 96. The bracket 92 can be releasably secured to the pedal body 40 such as with screws 98, as shown in FIG. 1. The bracket 92 can include a drive pin flange 100 that defines a bore 102. The bracket 92 can include a pair of outer shoulders 104 and a central shoulder 106 associated with the bore 102, as shown in FIG. 6.

Figure 7:
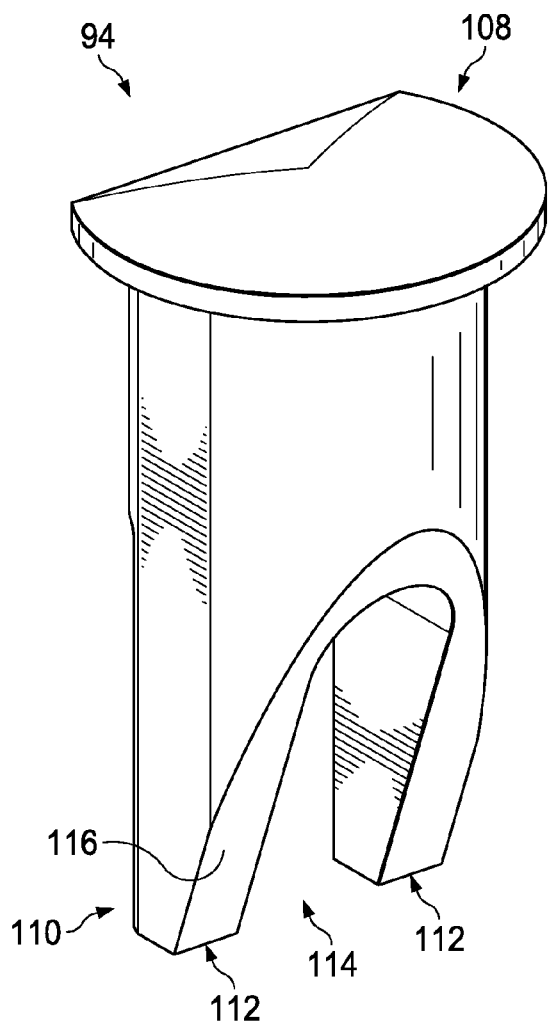
FIG. 7 is a front perspective view of an actuator pin of the pedal assembly of FIG. 1.
Figure 8:
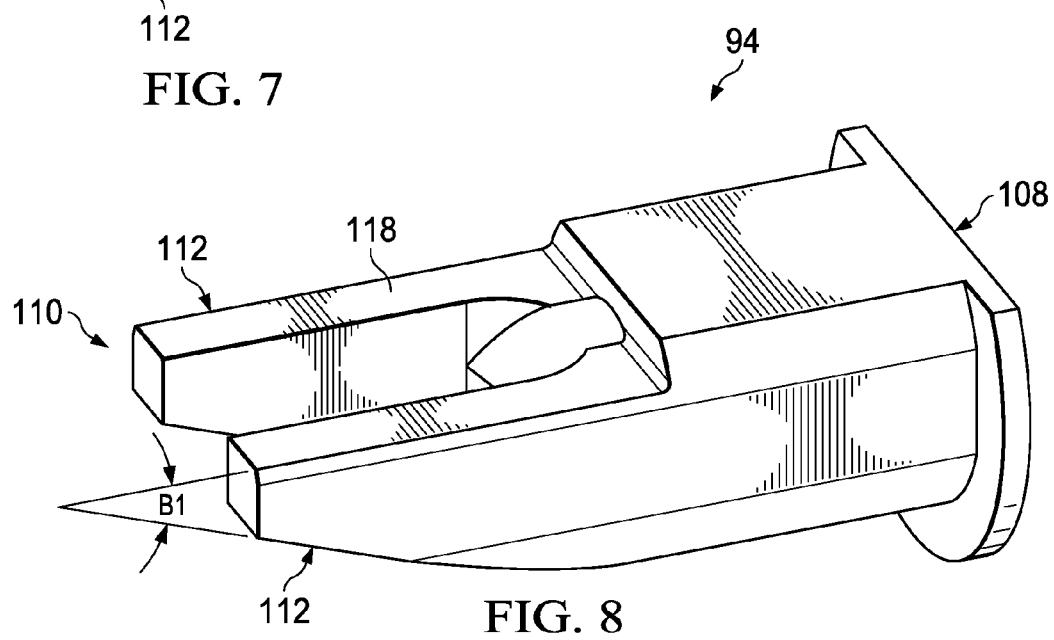
FIG. 8 is a side perspective view of the actuator pin of FIG. 7.

Referring now to FIGS. 7 and 8, the actuator pin 94 can include a head end 108 and a chamfered end 110. The chamfered end 110 can include a pair of forked members 112 that cooperate to define a slot 114. The chamfered end 110 can include a front surface 116 and a rear surface 118. The front surface 116 can be angled with respect to the rear surface 118 such that the forked members 112 are tapered. In one embodiment, as illustrated in FIGS. 7 and 8, the front and rear surfaces 116, 118 can be angled with respect to each other by an angle B1. In one embodiment, the angle B1 can be between about 1 degree and about 45 degrees.

The actuator pin 94 can be slidably coupled with the pedal body 40 and can be slidable between a released position (FIG. 5) and a depressed position (not shown) along an axis A3. In one embodiment, as illustrated in FIG. 5, the chamfered end 110 of the actuator pin 94 can be sandwiched between the outer shoulders 104 of the bracket 92 with the central shoulder 106 disposed within the slot 114 such that the actuator pin 94 is slidably coupled with the bracket 92. The actuator pin 94 can be frictionally engaged with the shoulders 104, 106 to prevent lateral movement of the actuator pin 94 away from the bracket 92. However, any of a variety of suitable alternative arrangements are also contemplated for preventing lateral movement of the actuator pin 94 away from the bracket 92 while permitting slidable movement. In one embodiment, the spring (not shown) can be provided between the head end 108 of the actuator pin 94 and the outer shoulders 104 of the bracket 92 to bias the actuator pin 94 into the released position.

Figure 9:
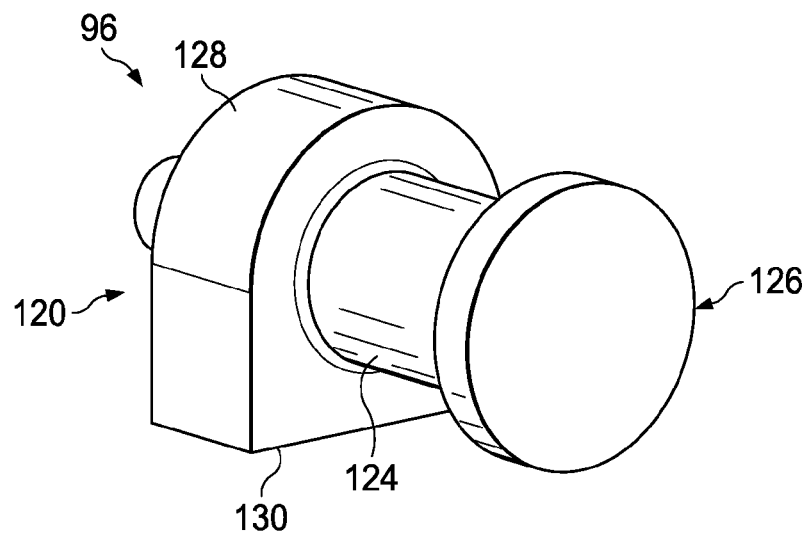
FIG. 9 is a front perspective view of a drive pin of the pedal assembly of FIG. 1.
Figure 10:
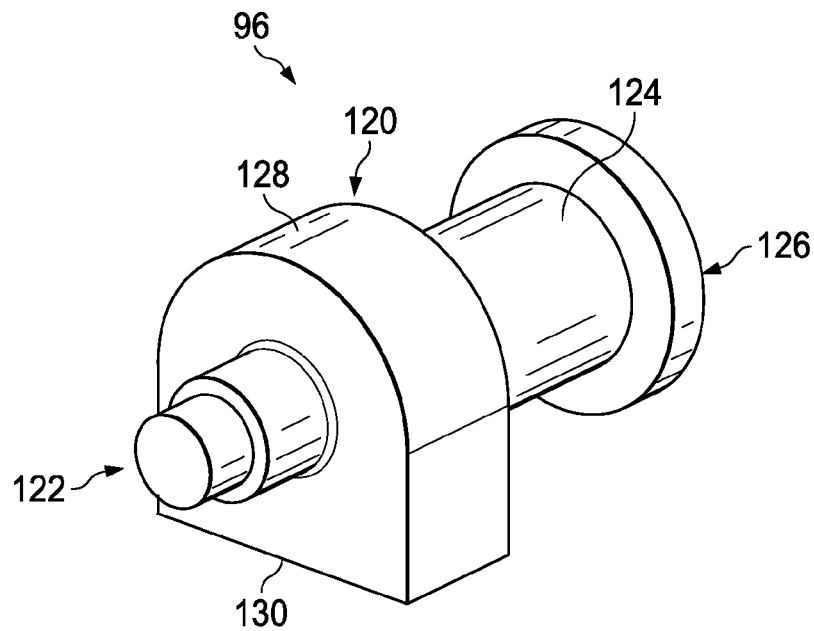
FIG. 10 is a side perspective view of the drive pin of FIG. 10.

Referring now to FIGS. 9 and 10, the drive pin 96 can comprise a body 120, an outer pin 122, and an inner pin 124. The outer pin 122 and the inner pin 124 can extend away from the body 120 in substantially opposite directions. The outer pin 122 can have a larger overall diameter than the inner pin 124. A shoulder portion 126 can be disposed at a distal end of the outer pin 122. The body 120 can have a substantially curved upper portion 128 and a substantially planar lower portion 130.

The drive pin 96 can be movably coupled with the pedal body 40. In one embodiment, the drive pin 96 can be disposed within the recess 52 (FIG. 3) with the inner pin 124 extending through the bore 54 and into the passageway 42 of the pedal body 40. The curved upper portion 128 of the drive pin 96 can be contoured to mate with the recess 52. The substantially planar lower portion 130 of the drive pin 96 can be configured to mate with the notched portions 56 of the recess 52. As illustrated in FIG. 5, with the drive pin 96 inserted into the recess 52, the drive pin flange 100 of the bracket 92 can overlie the body 120 of the drive pin 96 such that the body 120 is sandwiched between the pedal body 40 and the drive pin flange 100, and the outer pin 122 extends though the bore 102 of the drive pin flange 100.

The drive pin 96 can be movable with respect to the pedal body 40 between an inserted position (not shown) and a withdrawn position (FIG. 5) along an axis A4. When the drive pin 96 is in the inserted position, the inner pin 124 can extend into the passageway 42 and can be inserted into one of the cam grooves 28, 30 (FIG. 2) of the axle 22. With the inner pin 124 inserted into one of the cam grooves 28, 30 (FIG. 2) of the axle 22, the pedal body 40 is permitted to move laterally with respect to the axle 22 generally along the axis A1 when the pedal body 40 is rotated with respect to the axle 22. As such, when the pedal assembly 20 rotates with respect to a crankshaft (not shown), such as to pedal a bicycle, for example, the pedal body 40 is permitted to move laterally along the axle 22.

It is to be appreciated that with the cam grooves 28, 30 arranged in the manner illustrated in FIG. 2, the pedal body 40 can be closest to the crankshaft when the pedal assembly 20 is at its upper most rotational position and furthest from the crankshaft when the pedal assembly 20 is at its lower most rotational position.

The actuator pin 94 can be associated with the drive pin 96 such that the drive pin 96 can be movable between the inserted position and the withdrawn position in response to movement of the actuator pin 94 between the released position and the depressed position, respectively. For example, when the actuator pin 94 is in the released position, as illustrated in FIG. 5, the drive pin 96 is in the inserted position. When the actuator pin 94 is depressed into the depressed position (not shown), the chamfered end 110 can engage with the shoulder portion 126 of the outer pin 122 and can urge the drive pin 96 into the withdrawn position.

In one embodiment, as illustrated in FIGS. 1 and 5, when the actuator pin 94 is in the released position, the head end 108 can extend into the upper area 70 of the pedal body 40. When the cleat 88 is inserted into the clips 60, 62, the cleat 88 can contact the head end 108 and can urge the actuator pin 94 into the depressed position thereby moving the drive pin 96 into the withdrawn position.

Referring again to FIG. 1, the pedal assembly 20 can include another drive pin assembly 132 that is similar in many respects to the drive pin assembly 90 but is instead provided on the pedal body 40 opposite the drive pin assembly 90 and in an upside-down arrangement. The drive pin assembly 132 can include an actuator pin (not shown) and a drive pin (not shown) that are similar to the actuator pin 94 and the drive pin 96, respectively. However, a head end (not shown) of the actuator pin (not shown) of the drive pin assembly 132 can extend into the lower area 72 of the pedal body 40 such that the head end can be contacted by a cleat (e.g. 88) inserted into the clips 60, 62 at the lower area 72. As such, when the cleat is not inserted into the clips 60, 62, each of the actuator pins (e.g., 94) can be in their respective released positions such that the respective drive pins (e.g., 96) are in their inserted positions. The drive pins can both be inserted into the same cam groove (e.g., 28 or 30) which can prevent the pedal body 40 from moving laterally with respect to the axle 22, thus effectively locking the pedal body 40. Once the cleat 88 is inserted into the clips 60, 62, as illustrated in FIG. 1, the cleat 88 can depress the actuator pin 94 which can cause the drive pin 96 to withdraw from the cam groove (e.g., 28, 30) thus unlocking the pedal body 40. The other drive pin (e.g., of the drive pin assembly 132) can remain inserted into the cam groove (e.g., 28, 30). When the pedal body 40 is rotated, the drive pin of the drive pin assembly 132 can serve as a follower (e.g., in a cam-follower type arrangement), thus causing the pedal body 40 to move laterally with respect to the axle 22 along the axis A1.

In one embodiment, the pedal body 40 can be movable between a first axle position and a second axle position along the axle 22. In such an embodiment, the pedal body 40 can be in the first axle position when the drive pins (e.g., 96) are inserted into the cam groove 28 and can be in the second axle position when the drive pins (e.g., 96) are inserted into the cam groove 30. A user can select from between the different axle positions by depressing each of the actuator pins (e.g., 94) to release the pedal body 40 from the current cam groove (e.g., 28) and sliding the pedal body 40 until the drive pins (e.g., 96) register with a different cam groove (e.g., 30).

Referring now to FIGS. 11-17, an apparatus for determining a pedal configuration for a user will now be discussed. As will be described in more detail below, the apparatus can be fitted to a stationary bicycle, a traditional bicycle, or any of a variety of suitable alternative velocipede arrangements to facilitate tracking and monitoring of a pedal body (e.g., 1040) and/or a rider while the rider is operating the bicycle. In the case of a traditional bicycle, in some embodiments, the traditional bicycle can be altered to be made stationary by, for example, suspending a rear wheel of the bicycle (e.g., with a mechanical frame). The data gathered from the pedal and/or rider can be used in providing a personalized pedal configuration for the rider.

Figure 11:
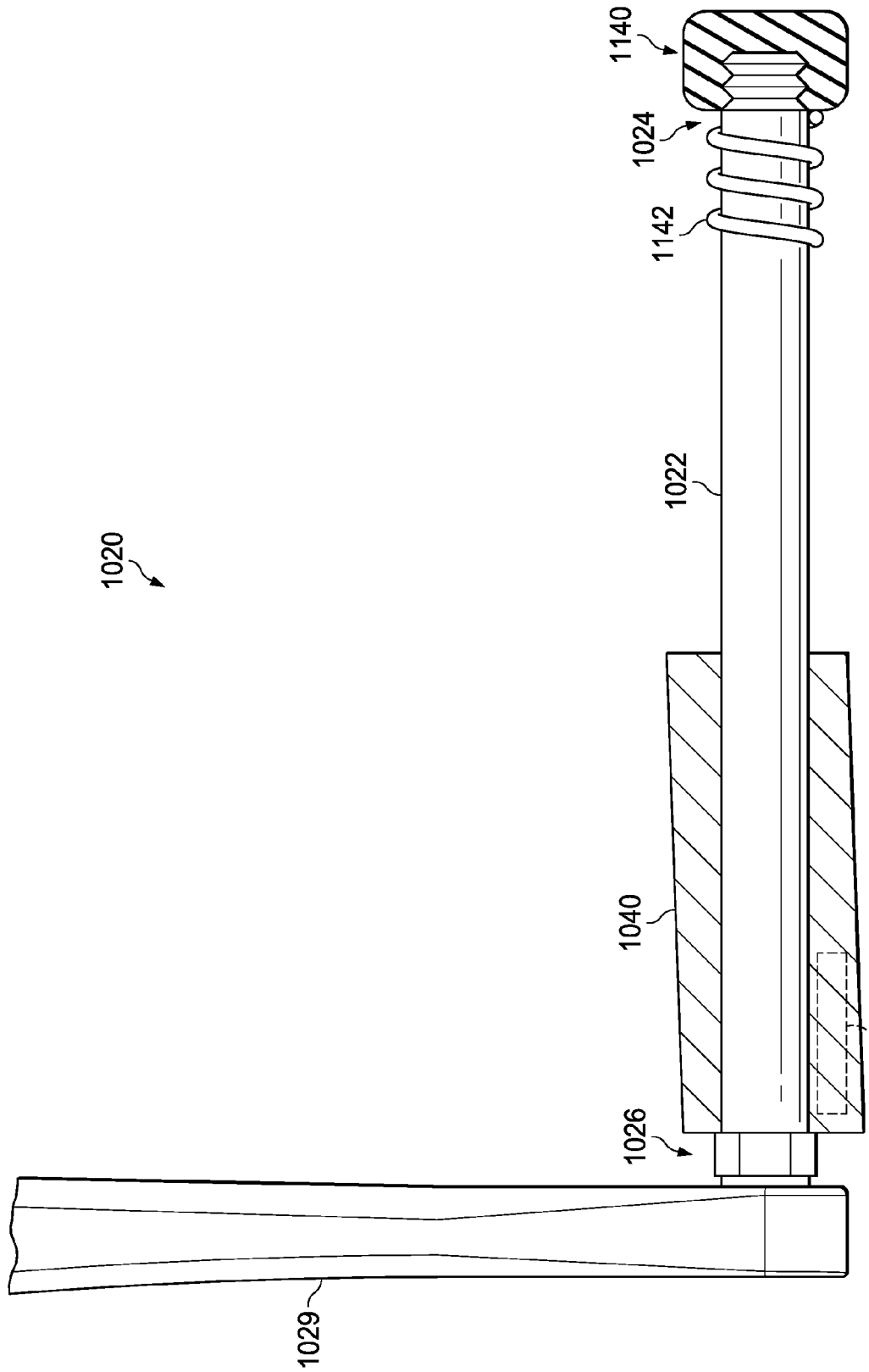
FIG. 11 is a front plan view of a pedal assembly of an apparatus for determining a pedal configuration for a user.

As illustrated FIG. 11, the apparatus can include a pedal assembly 1020 that is similar to, or the same as in many respects, pedal assembly 20 illustrated in FIGS. 1-10. For example, the pedal assembly 1020 can include an axle 1022 and a pedal body 1040 rotatably coupled with the axle 1022. The axle 1022 can include a distal end 1024 and a proximal end 1026. The proximal end 1026 can be releasably coupled with a crankshaft 1029. The crankshaft 1029 can be operably coupled with a drive member, such as a sprocket 1031 (e.g., FIGS. 13-16). The sprocket 1031 can be configured to rotate about a rotation axis R1. In one embodiment, the axle 1022 can be generally perpendicular to the crankshaft 1029 or, in another embodiment, the axle 1022 can be disposed at a different angle relative to the crankshaft 1029. The axle 1022 can be any suitable length, such as, for example, about 12 inches.

However, the pedal body 1040 can be configured to slide freely along the axle 1022 (e.g., without guidance from a drive pin or cam groove). The distal end 1026 can accordingly include a shoulder portion 1140 and a spring 1142 disposed between the pedal body 1040 and the shoulder portion 1140. The spring 1142 (or other biasing member) can be configured to bias the pedal body 1040 away from the shoulder portion 1140. The shoulder portion 1140 can be configured to prevent lateral movement of the pedal body 1040 beyond the shoulder portion 1140. It is to be appreciated that in an alternative embodiment, an apparatus for determining a pedal configuration for a user can include a groove and a guide pin that directs the lateral movement of a pedal body with respect to an axle. In such an embodiment, the apparatus might not include a shoulder portion (e.g., 1140).

A sensor 1143 can be disposed on the pedal body 1040 and configured to detect spatial position data of the pedal body 1040. In one embodiment, the sensor 1143 can be an accelerometer and/or a global positioning system. In some embodiments, the sensor 1143 can be attached to an exterior of the pedal body 1040 and in other embodiments, the sensor 1143 can be integral with the pedal body 1040.

Figure 12:
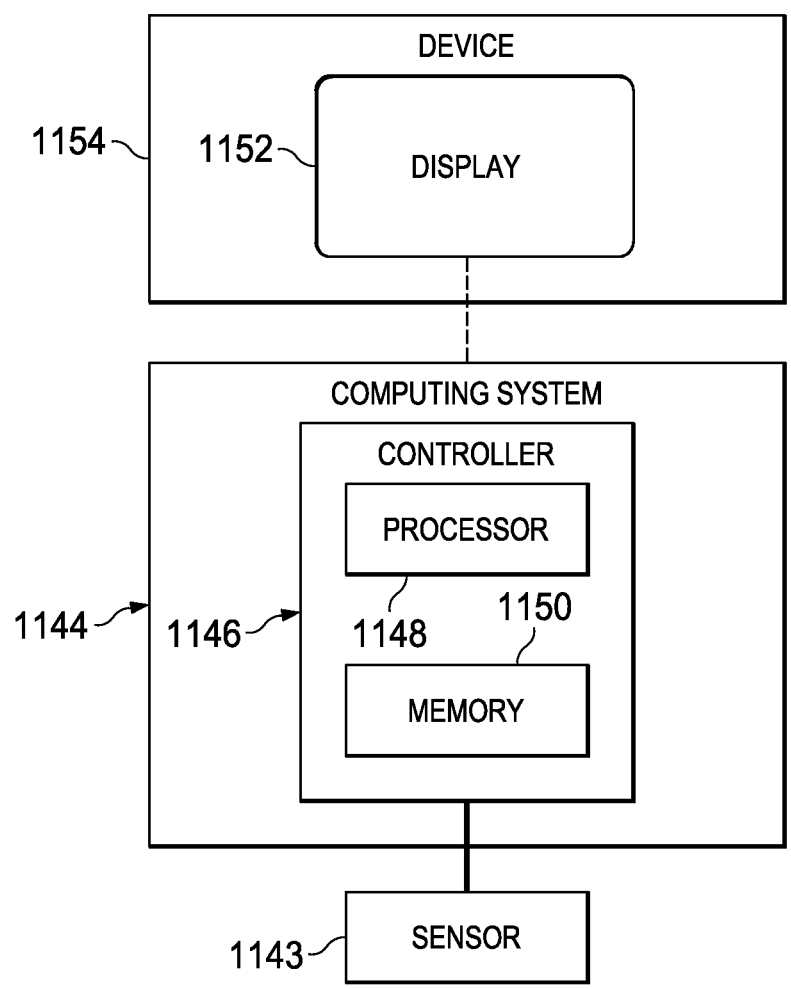
FIG. 12 is a schematic view of a computing system along with other components of an apparatus for determining a pedal configuration for a user.

The sensor 1143 can be in electronic communication with a computing system 1144, as illustrated in FIG. 12. The computing system 1144 can include a controller 1146 having a processor 1148 and memory 1150. The controller 1146 can be in electronic communication with the sensor 1143 such as through any of a variety of wired or wireless communication protocols. The controller 1146 can be configured to receive the spatial data from the sensor 1143.

Figure 13:
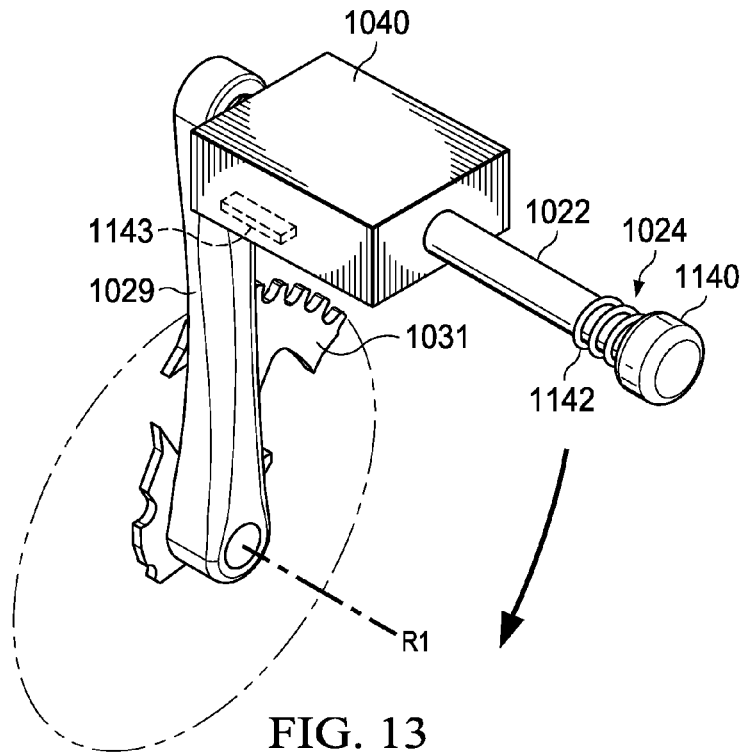
FIG. 13 is a perspective view of the pedal assembly of FIG. 11 in association with a crankshaft and a sprocket, wherein the pedal assembly, the crankshaft and the sprocket are shown a top of a stroke.
Figure 14:
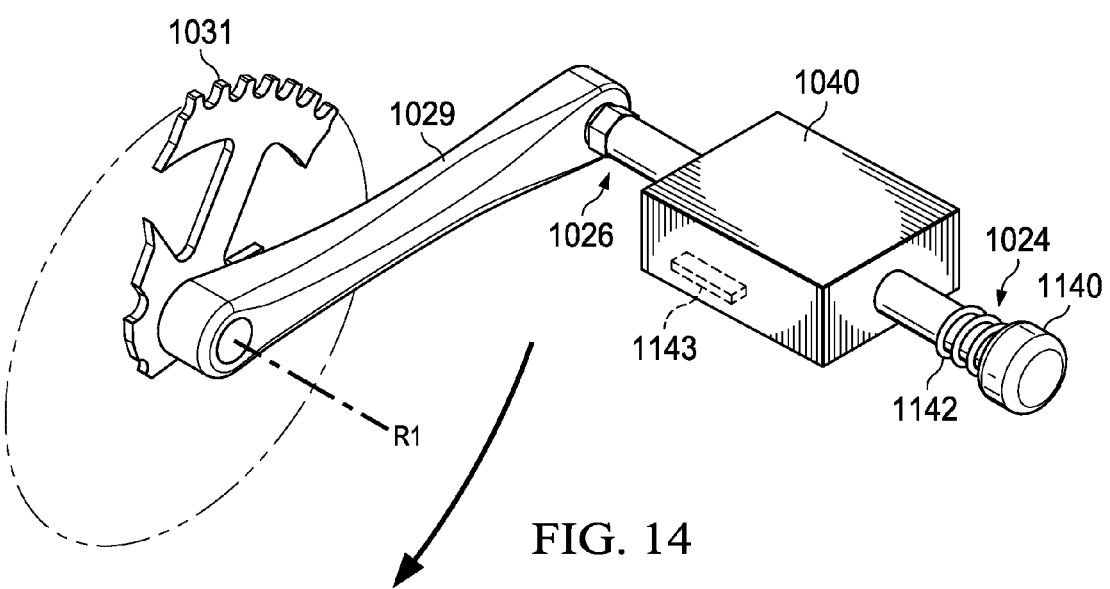
FIG. 14 is a perspective view of the pedal assembly, the crankshaft and the sprocket of FIG. 13, but with the pedal assembly, the crankshaft and the sprocket shown in a forwardly rotating position.
Figure 16:
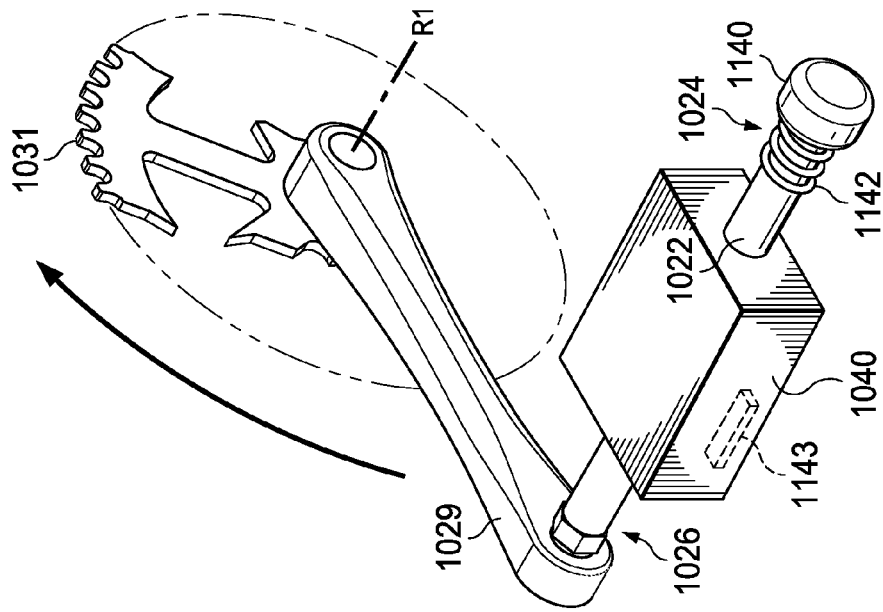
FIG. 16 is a perspective view of the pedal assembly, the crankshaft and the sprocket of FIG. 13, but with the pedal assembly, the crankshaft and the sprocket shown in an upwardly rotating position.
Figure 15:
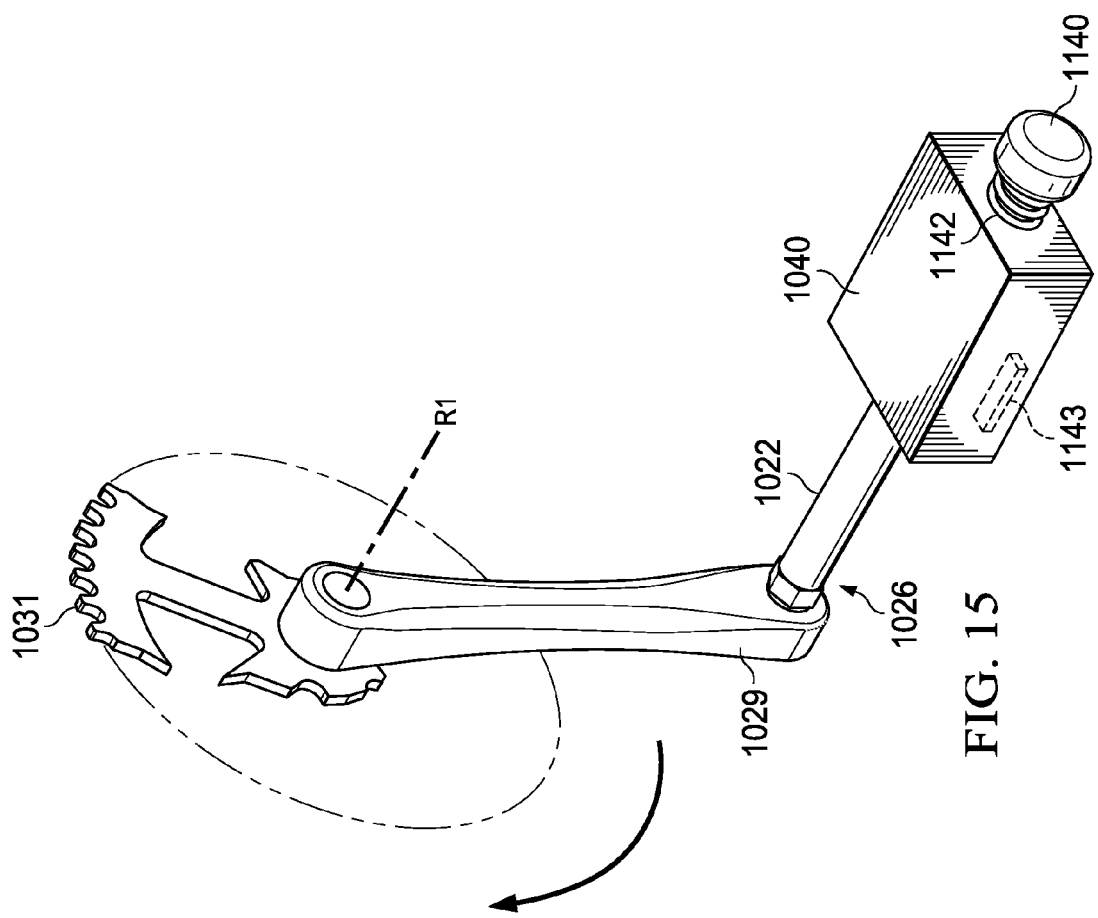
FIG. 15 is a perspective view of the pedal assembly, the crankshaft and the sprocket of FIG. 13, but with the pedal assembly, the crankshaft and the sprocket shown in a downwardly rotating position.

Referring now to FIGS. 13-16, rotation of the sprocket 1031 with the pedal assembly 1020 and collection of data from the pedal body 1040 will now be described. As illustrated in FIG. 13, the crankshaft 1029, the sprocket 1031, and the pedal assembly 1020 is at a top of a stroke. When a rider applies downward force to the pedal body 1040 from this position, the crankshaft 1029 and sprocket 1031 can rotate forwardly into the position shown in FIG. 14. As the crankshaft 1029 and sprocket 1031 rotate forwardly, the pedal body 1040 can simultaneously rotate and translate with respect to the axle 1022 such that the pedal body 1040 is substantially parallel and is disposed about midway between the crankshaft 1029 and the shoulder portion 1140. As the rider continues to apply force to the pedal body 1040, the crankshaft 1029 and sprocket 1031 can rotate downwardly into the position shown in FIG. 15. As the crankshaft 1029 and sprocket 1031 rotate downwardly, the pedal body 1040 can simultaneously rotate and translate with respect to the axle 1022 such that the pedal body 1040 is substantially parallel and in contact with the spring 1142 such that the spring 1142 urges the pedal body 1040 away from the shoulder portion 1140. As the rider continues to pedal, the crankshaft 1029 and sprocket 1031 can rotate upwardly into the position shown in FIG. 16. As the crankshaft 1029 and sprocket 1031 rotate upwardly, the pedal body 1040 can simultaneously rotate and translate with respect to the axle 1022 such that the pedal body 1040 is substantially parallel and is disposed about midway between the crankshaft 1029 and the shoulder portion 1140. As the rider continues to pedal, the crankshaft 1029 and sprocket 1031 can rotate upwardly and into the position shown in FIG. 13.

As the pedal body 1040 rotates and translates through the positions illustrated in FIGS. 13-16, the sensor 1143 can repeatedly transmit spatial data, such as rotational data and lateral data, for example, to the controller 1146. The controller 1146 can be configured to determine the rotation motion and lateral motion of the pedal body 1040 from the rotational data and lateral data, respectively. In one embodiment, the controller 1146 can be configured to timestamp the rotational position data and the lateral position data to facilitate determination of the rotational motion and the lateral motion, respectively, of the pedal body 1040. In such an embodiment, the order and timing of the timestamps (e.g., data points) can be utilized to create a spatial representation of the user's pedal stroke.

The controller 1146 can also determine additional spatial information about the pedal body 1040 from the spatial data, such as, for example, the position of the pedal body 1040 with respect to the axle 1022, the position of the pedal body 1040 with respect to the sprocket 1031, angular distance, angular speed, downward force applied, translation distance, lateral speed, pronation, supination, angular rotation, and/or lateral force applied.

In one embodiment, the controller 1146 can analyze the received spatial data and can suggest optimal pedal configurations for the user based upon the spatial data. The optimal pedal configurations can be focused on comfort, performance, ergonomic alignment, or any of a variety of other metrics that can be affected by pedal position and/or lateral travel (e.g., axle length). In another embodiment, the controller 1146 can output the spatial data to an analyst, such as a coach, who can then suggest optimal pedal configurations based upon the spatial data. In one embodiment, as illustrated in FIG. 12, a display 1152 can be provided for displaying information to a user. The display 1152 can be incorporated into a device 1154 which can be a personal digital assistant (PDA), smartphone or a laptop computer, for example.

It is to be appreciated that any of a variety of sensors or electronic devices can be associated with the pedal body 1040 to facilitate effective monitoring of a user. In one embodiment, a power meter (not shown) can be associated with the pedal body 1040 and can be configured to detect a power input to the pedal body 1040 from a user. The display 1152 can be configured to display the power input from the user. In some embodiments, the power output of one of the user's legs can be correlated to the lateral position of the pedal body 1040 along a pedal stroke. In another embodiment, a tensioning device (not shown) can be associated with the pedal body 1040 and configured to adjust tension between the pedal body 1040 and the axle 1022 in response to power input from a user to the pedal body 1040.

Figure 17:
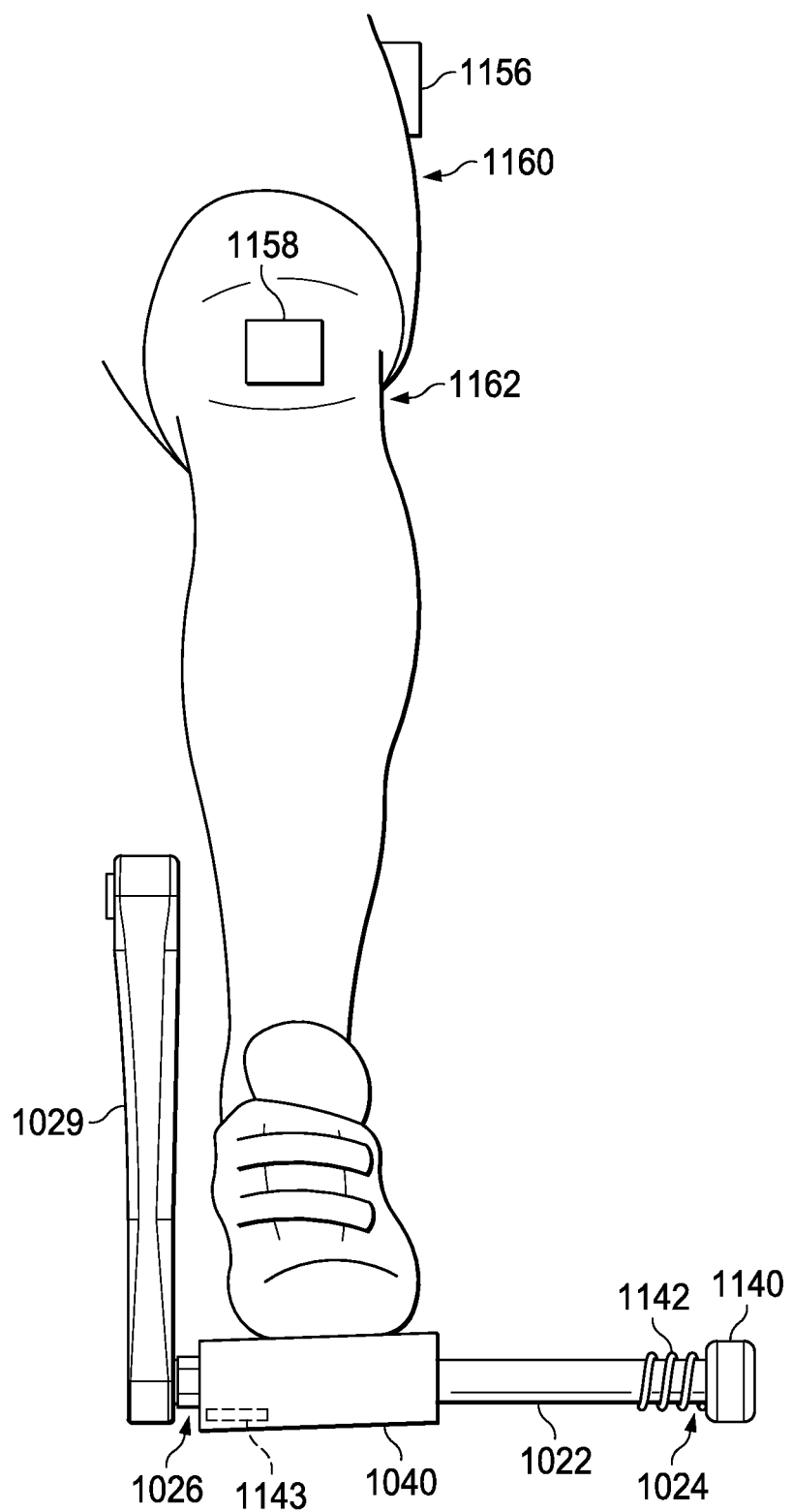
FIG. 17 is a front view of a user's leg in association with the pedal assembly of FIG. 11.

Referring now to FIG. 17, in one embodiment, a trackable hip marker 1156 and a trackable knee marker 1158 can be provided. The trackable hip marker 1156 can be attached to a hip 1160 of a user and can be configured to facilitate tracking of motion of the hip 1160. More particularly, the trackable hip marker 1156 can indicate the spatial position of the hip 1160 during pedaling. The trackable knee marker 1158 can be selectively attached to a knee 1162 of a user and can be configured to facilitate tracking of motion of the knee 1162. More particularly, the trackable knee marker 1158 can indicate the spatial position of the user's knee 1162 during pedaling. A trackable marker can be affixed at any of a variety of suitable locations on a user's body for tracking motion of a body part using any of a variety of attachment techniques, such as, directly to a user's skin, clothing, adjacent to a bony prominence (e.g., the crest of the pelvis), and with tape, hook and loop fasteners, elastic, magnets, or the like.

In one embodiment, the computing system 1144 can employ a tracking system (not shown) that detects and tracks the spatial (e.g., three-dimensional) position of each of the trackable hip marker 1156 and the trackable knee marker 1158 as the user pedals. In such an embodiment, the order and timing of the data points can be utilized to create a spatial representation of the user's hip 1160 and/or knee 1162 during a pedal stroke. The spatial representation of the hip 1160 and/or knee 1162 can be analyzed to determine how knee position and/or hip position contribute to power output, efficiency, and/or comfort. For example, a graphical representation of the path of the user's hip 1160 and/or knee 1162 can be generated and analyzed to determine how certain deviations affect power output (e.g., how the deviation of the knee 1162 from optimum affects power output and efficiency). Additionally, the spatial representation of the hip 1160 and/or knee 1162 can provide useful information for selecting the proper pedals and/or pedal configuration.

It is to be appreciated that any of a variety of suitable alternative trackable markers can be provided for attaching to a body part of a user and tracking motion of the body part. It is also to be appreciated that any of a variety of trackable marking systems are contemplated. For example, an active optical trackable marking system can be provided having an active trackable marker, such as an LED or acoustic wave source that emits a signal (e.g., light or sound) to a detector to facilitate tracking of the position of the marker. In another example, a passive optical trackable marking system can be provided having a passive trackable marker, such as a retro-reflective marker, that reflects light from a source to a detector to facilitate tracking of the position of the marker.

It is to be appreciated that data from more than one user can be aggregated, compared, and shared between, for example, third parties such as branches of commercial cycling establishments. Analysis of aggregated data can provide insight into both detrimental and beneficial performance patterns shared among cyclists. Such a tool can therefore have predictive value for determining the proper pedal choice, position or orientation for an individual cyclist.

The pedal body 1040 shown in FIGS. 11 and 13-17 can be employed as a left pedal or a right pedal and can be used in conjunction with a conventional pedal or another similar pedal body. It is to be appreciated that, although the pedal body 1040 is shown to be provided in a flat-type arrangement, the pedal body can be provided in any of a variety of clip and clipless arrangements. It is also to be appreciated that, in some embodiments, the pedal body can be a floating-type pedal such that the pedal body 1040 can translate on the axle 1022 unencumbered by additional mechanical structure which would resist translation.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. An apparatus for determining a pedal configuration for a user, the apparatus comprising:
an axle comprising a distal end and a proximal end, the proximal end being configured for releasable attachment to a crankshaft;
a pedal body rotatably coupled with the axle and rotatable with respect to the axle about an axis, the pedal body being further configured to move laterally with respect to the axle generally along the axis; and
at least one sensor disposed on the pedal body; wherein:
the pedal body is configured to facilitate rotation of the crankshaft, and the at least one sensor is configured to detect spatial position data, the spatial position data comprising rotational data for the pedal body and lateral data for the pedal body; and
the distal end of the axle comprises a shoulder portion configured to prevent lateral movement of the pedal body beyond the shoulder portion.

2. The apparatus of claim 1, further comprising a biasing member coupled with axle and disposed between the pedal body and the shoulder portion wherein the spring biases the pedal body away from the shoulder portion.

3. The apparatus of claim 1 further comprising a controller configured to receive the spatial position data.

4. The apparatus of claim 1 further comprising a power meter associated with the pedal body and configured to detect a power input to the pedal from a user.

5. The apparatus of claim 4 further comprising a display device configured to display the power input from the user.

6. The apparatus of claim 5 further comprising a computing device in combination with the display device.

7. The apparatus of claim 6 wherein the computing device comprises a smartphone.

8. An apparatus for determining a pedal configuration for a user, the apparatus comprising:
an axle comprising a distal end and a proximal end, the proximal end being configured for releasable attachment to a crankshaft;
a pedal body rotatably coupled with the axle and rotatable with respect to the axle about an axis, the pedal body being further configured to move laterally with respect to the axle generally along the axis; and
at least one sensor disposed on the pedal body; wherein:
the pedal body is configured to facilitate rotation of the crankshaft, and the at least one sensor is configured to detect spatial position data, the spatial position data comprising rotational data for the pedal body and lateral data for the pedal body; and
the at least one sensor comprises a global positioning system.

9. An apparatus for determining a pedal configuration for a user, the apparatus further comprising:
an axle comprising a distal end and a proximal end, the proximal end being configured for releasable attachment to a crankshaft;
a pedal body rotatably coupled with the axle and rotatable with respect to the axle about an axis, the pedal body being further configured to move laterally with respect to the axle generally along the axis;
at least one sensor disposed on the pedal body; and
at least one trackable marker configured for attaching to a body part of a user and configured to facilitate tracking of motion of the body part.

10. The apparatus of claim 9 wherein the at least one trackable marker comprises an electronic marker.

11. The apparatus of claim 9 wherein the at least one trackable marker comprises a trackable hip marker configured for attaching to a hip of a user and configured to facilitate tracking of motion of the hip.

12. The apparatus of claim 9 wherein the at least one trackable marker comprises a trackable knee marker configured for attaching to a knee of a user and configured to facilitate tracking of motion of the knee.

13. An apparatus for determining a pedal configuration for a user, the apparatus further comprising:
an axle comprising a distal end and a proximal end, the proximal end being configured for releasable attachment to a crankshaft;
a pedal body rotatably coupled with the axle and rotatable with respect to the axle about an axis, the pedal body being further configured to move laterally with respect to the axle generally along the axis;
at least one sensor disposed on the pedal body; and
a tensioning device associated with the pedal body and configured to adjust tension between the pedal body and the axle in response to power input from a user to the pedal body.

14. A method of determining a pedal configuration for a user, the method comprising:
providing a bicycle comprising:
a crankshaft;
an axle comprising a distal end and a proximal end, the proximal end being releasably attached to the crankshaft;
a pedal body comprising an engagement surface, the pedal body being rotatably coupled with the axle and rotatable with respect to the axle about an axis, the pedal body being further configured to move laterally with respect to the axle generally along the axis;
at least one sensor disposed on the pedal body and configured to detect spatial position data, the spatial position data comprising rotational position data for the pedal body and lateral position data for the pedal body; and
a controller configured to receive the spatial position data;
rotating the crankshaft by applying force to the engagement surface;
receiving, by the controller, the spatial position data; and
determining, by the controller, a rotational motion of the pedal from the rotational position data; and
determining, by the controller, a lateral motion of the pedal from the lateral position data.

15. The method of claim 14 further comprising:
attaching a trackable marker to a body part of a user; and
tracking, by the controller, motion of the body part.

16. The method of claim 15 further comprising:
attaching a trackable hip marker to a hip of a user; and
tracking, by the controller, motion of the hip.

17. The method of claim 16 further comprising:
attaching a trackable knee marker to a knee of a user; and
tracking, by the controller, motion of the knee.

18. The method of claim 14 further comprising detecting a power input to the pedal body from a user.

19. The method of claim 18 further comprising displaying the power input to the pedal body from the user.

20. The method of claim 18 further comprising adjusting a tension between the pedal body and the axle in response to the power input from the user to the pedal body.

* * * * *